Nov. 2, 1926.    J. J. JORDAN ET AL    1,605,742
PITMAN
Filed August 4, 1921
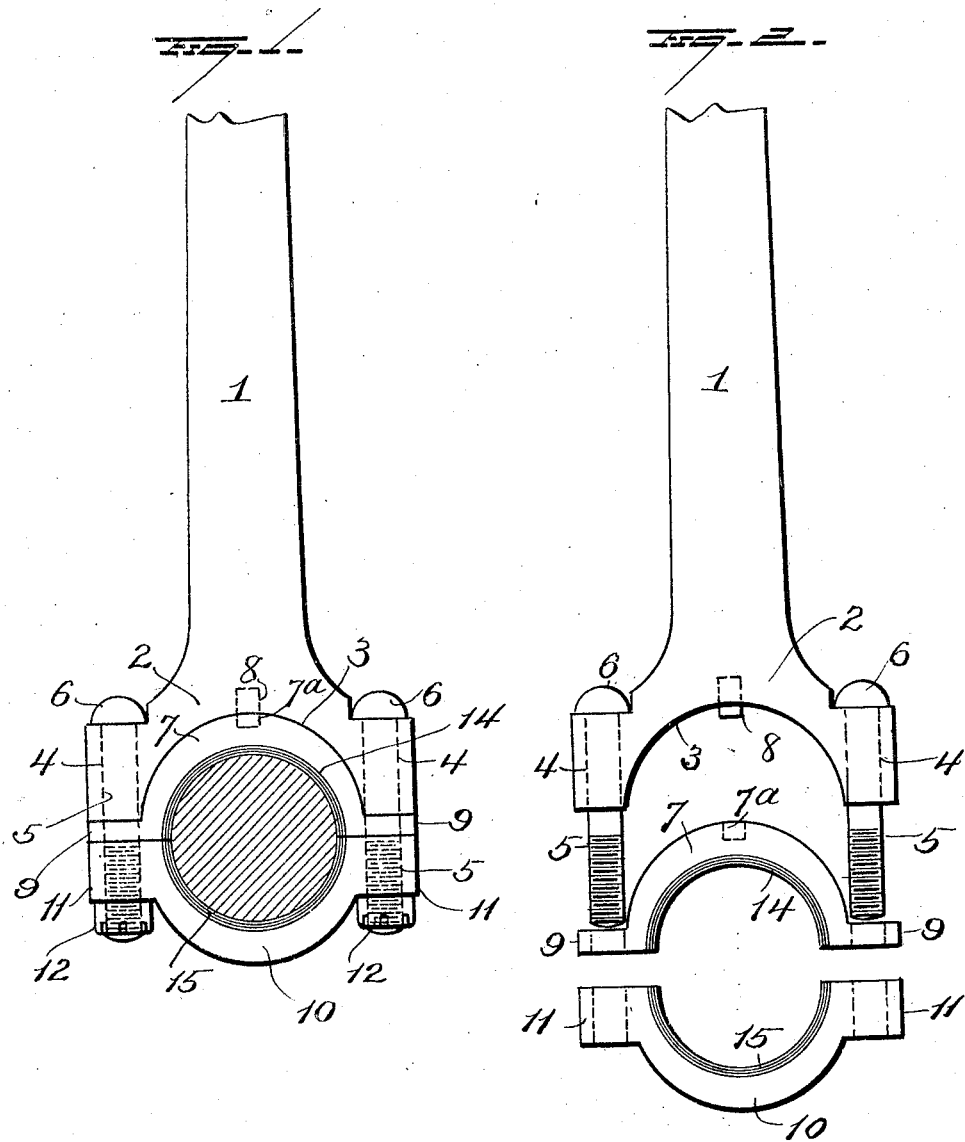

Patented Nov. 2, 1926.

1,605,742

UNITED STATES PATENT OFFICE.

JOHN J. JORDAN AND FRED H. INMAN, OF GOLDFIELD, NEVADA.

PITMAN.

Application filed August 4, 1921. Serial No. 489,923.

This invention relates to improvements in pitmen and more particularly to a pitman or connecting rod construction such as employed between the piston of an internal combustion engine and the crank-shaft,—one object of the invention being to so construct the means for connecting the pitman with a crank of a driven shaft as to facilitate the removal and renewal of the inner or upper half-bearing member without necessity for removal of the piston, with which the pitman is connected, from the cylinder to repair the bearings of the means for connecting the pitman to the crank of the shaft.

With this and other objects in view, the invention consists in certain novel features as hereinafter set forth and pointed out in the claim.

In the accompanying drawings, Figure 1 is a view of a pitman embodying our improvements, with the parts assembled, and Figure 2 is a view showing the parts separated.

The body portion of the pitman is indicated at 1 and is intended to be connected with the piston of an internal combustion engine (not shown) in any suitable manner. At one end the pitman is provided with an enlarged portion 2 forming a yoke having a curved inner face 3 and this enlarged or yoke portion 2 is provided at diametrically opposite sides with holes 4 for the passage of bolts 5,—one end of each of which is provided with a head 6 to engage a shouldered portion of the yoke and the other portion of each bolt is threaded.

An approximately semi-circular half bearing member 7 is removably mounted in the yoke 2 so as to rest against the curved face 3 thereof and this bearing member is provided centrally with a socket 7ª to receive a dowel 8 secured to the yoke portion of the pitman whereby said bearing member is prevented from displacement. The bearing member 7 is provided at respective ends with perforated lugs 9 for the passage of the bolts 5 and when said member is in place, these lugs will rest against the yoke portion of the pitman. The other portion or half-bearing for connecting the pitman with the crank of the driven shaft, consists of a cap 10 having diametrically opposite lugs 11 for the passage of the bolts 5. These lugs bear against the lugs 9 of the half-bearing member 7 when the parts are in the assembled positions shown in Figure 1 and nuts 12 are screwed onto the projecting threaded ends of the bolts 5 and bear against the lugs 11 of the half-bearing member or cap 10. The half-bearing members 7 and 10 are provided respectively with suitable linings 14—15 such as Babbitt metal.

It will be seen that the bearing devices between the pitman and the crank of a driven shaft may be readily removed for repair or renewal purposes without necessity for disturbing the connection of the pitman with the piston of the engine or for removing said piston. By removing the nuts 12 the cap 10 may be taken off and the removal half-bearing member 7 which cooperates with said cap to form the bearing means between the pitman and the crank, may be readily removed and repaired or replaced with a new half-bearing member.

Having fully described our invention what we claim as new and desire to secure by Letters-Patent, is:

The combination of a pitman having a yoke at its end defining a concave face and flat-ended perforated lugs at the terminals of said face, the sides of the pitman forming shoulders at the rear ends of the lugs, a half-bearing seating against said concave face and having radial outstanding perforated flat-sided lugs resting against the flat-ended lugs of the yoke, a second half-bearing arranged reversely to the first-half bearing and having radial outstanding flat-sided lugs resting against the lugs of the first half-bearing, a dowel engaged in the yoke and the first-mentioned half bearing centrally thereof, and bolts inserted through the lugs to hold them in close contact and secure all the parts together, the two half-bearings together completely encircling an engaged crank, the heads of the bolts bearing against the shoulders on the sides of the pitman and the threaded ends of the bolts carrying nuts to be turned home against the lugs on the second-mentioned half bearing.

In testimony whereof, we have signed this specification.

JOHN J. JORDAN.
FRED H. INMAN.